FADER AMPLIFIER COMPRISING VARIABLE GAIN TRANSISTOR CIRCUITS

Filed Jan. 21, 1964

United States Patent Office 3,260,952

Patented July 12, 1966

3,260,952

FADER AMPLIFIER COMPRISING VARIABLE GAIN TRANSISTOR CIRCUITS

Alan R. Kaye and Cecil L. Murray, Ottawa, Ontario, Canada, assignors to Northern Electric Company Limited, Montreal, Quebec, Canada Filed Jan. 21, 1964, Ser. No. 339,216

1 Claim. (Cl. 330—29)

This invention relates to variable gain transistor circuits having improvements in respect of their ability to provide relatively distortion free amplification of wide band, comparatively large amplitude signals. Such circuits are of general applicability. One purpose for which they have been developed is for use in a television fader amplifier and they will be described below mainly with reference to this use. They are also useful in a television special effects amplifier, and in a time multiplexing system. These uses will also be explained below.

A fader amplifier is employed in a transmission system for the fading and/or cross mixing (superimposition, with or without changes of signal strength) of one or more signals, usually television signals.

Such devices are commonly referred to as fader amplifiers because their prime utility is in the fading in or fading out of a single video signal, or the simultaneous fading in of one signal and fading out of another (dissolving). Although such circuits can also be used for direct superimposition of video signals without fading, they will be referred to in this specification as "fader amplifiers." Moreover, the term "amplifier" is used in the sense of a circuit for modifying the amplitude of a signal, not necessarily to increase it.

Conventionally, television fader amplifiers are provided with a pair of control members, usually manually operable levers, one such member controlling the strength of a first video signal and the other member controlling the strength of a second video signal. By moving the control members simultaneously, the strength of one signal can be reduced while that of the other is increased so as theoretically to maintain a constant total signal strength while merging from one video signal to the other. This process is known as a complementary mix and may be expressed as $$C=pA+qB \qquad (1)$$

where A and B are the input video signals and are assumed to have the standard nominal television level. C is the combined output signal, and $$p+q=1 \qquad (2)$$

where $p$ and $q$ both lie somewhere in the range from zero to unity.

The same apparatus can be used for fading in or fading out a single signal, for superimposing a pair of signals each at full strength, or for fading in or fading out a pair of superimposed signals. In these later instances the total signal strength does not remain constant and the condition known as a non-complementary mix exists. The sum $p+q$ can now lie anywhere between zero and 2.

A fader amplifier can also be used in any other circumstance where remote control of the mixing and/or fading of wide-band signals is required, one such application being that of radio broadcasting.

Such fader amplifiers require circuits that can handle wide bandwidth signals of substantial amplitude and can do so with a minimum of distortion. It is the object of the present invention to provide a circuit that meets these criteria, and which is nevertheless simple and economical with components.

A further object of the invention is to provide a fader amplifier that also has utility as a special effects amplifier.

This object is achieved by the provision of an amplifier comprising (a) First input means for a first input signal A and second input means for a second input signal B, (b) A first pair of parallel connected transistors of like polarity connected with their collector-emitter circuits in series with said first input means, (c) A second pair of parallel connected transistors of like polarity connected with their collector-emitter circuits in series with said second input means, (d) Means connecting the bases of all said transistors to a reference voltage at least at signal frequencies, (e) Means biasing said transistors to conducting condition including control means for varying the bias on a selected transistor of each pair, (f) And output means in series with said selected transistor of one pair and the other transistor of the other pair for generating an output signal $$C=(1-k)A+B$$

where $k$ is a factor variable between zero and unity by said control means, (g) wherein said control means include means for repetitively pulsing the bias on said selected transistors to render the factor $k$ alternately substantially equal to zero and unity to repetitively switch said output C between signals A and B.

Further understanding of the various aspects of the present invention will be facilitated by reference to the accompanying drawings, the specific circuits illustrated being provided by way of example only, and the scope of the invention being defined by the appended claims.

Figure 1:
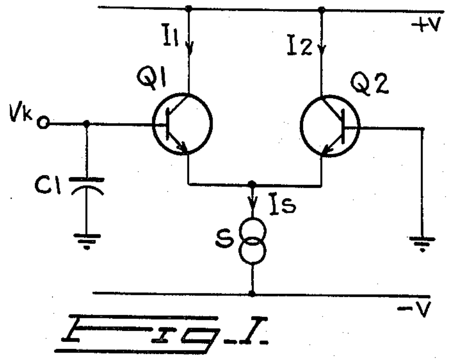
FIGURE 1 is a circuit provided by way of preliminary explanation.

In FIGURE 1, two transistors Q1 and Q2 of like polarity are shown with their collector-emitter electrodes connected as a parallel circuit between direct supply voltages +V and −V. The base of transistor Q2 is directly coupled to ground, while the base of transistor Q1 is grounded at signal frequencies through a capacitor C1, or any other suitable means such as a low output impedance D.C. amplifier. The base of transistor Q1 is biased by a control voltage V$k$ which could be supplied by the same D.C. amplifier. A signal generator shown diagrammatically at S is connected in series with this parallel circuit and is assumed to have an internal impedance very much higher than the low input impedance of the two transistors in parallel. The generator S is essentially a current generator rather than a voltage generator. By varying the control voltage V$k$ through a small range above and below ground potential (about ±0.2 volt) the ratio of the input impedance of the transistors Q1 and Q2 can be varied throughout the range from approximately 0 to a very large value tending towards infinity.

The current I$s$ will then divide itself between the two transistors as currents I1 and I2 in the ratio of such impedances. This can be expressed as $$I1=(1-k)Is \qquad (3)$$

and $$I2=kIs \qquad (4)$$

where $k$ may vary from zero to unity and is given by the expression $$k=\frac{1}{1+e^{Vk/Vt}} \qquad (5)$$

Equation 5 assumes that the collector voltage of the transistors has no effect on the current division, that the base currents of the transistors are negligible by comparison with the collector current, and that the impedance of any load in either collector circuit is low in comparison with the output impedance of the transistors. Equation 5 is dependent on the base of each transistor being connected to a reference voltage at all signal frequencies (which may include zero frequency). That is, each transistor is operating in the grounded base mode.

Figure 2:
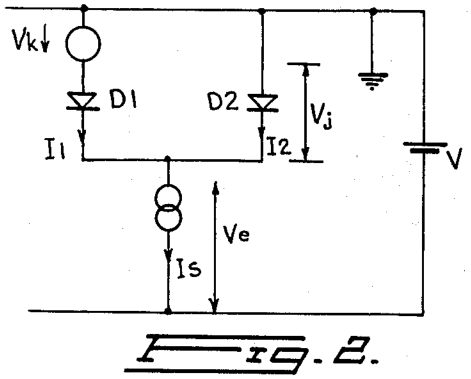
FIGURE 2 is a partial equivalent circuit for FIGURE 1.

This is illustrated by the partial equivalent circuit of FIGURE 2 which denotes the base-emitter junctions of transistors Q1, Q2 by diodes D1, D2.

The derivation of Equation 5 is as follows:

For any semiconductor junction $$I=Ir(e^{Vb/Vt}-1) \qquad (6)$$

where $I$=the current through the junction
$Ir$=the reverse saturation current
$Vb$=the forward bias across the junction
$Vt$=a constant for a given transistor at a given temperature At all usuable current levels Equation 6 can be approximated to $$I=Ire^{Vb/Vt}$$

which when applied to the circuit of FIGURE 2 gives $$I1=Ire^{(Vj+Vk)/Vt}$$

and $$I2=Ire^{Vj/Vt}$$

where $$Vj=V-Ve$$

and $Ve$=the voltage across the source S

Since $$Is=I1+I2$$

then $$Is=Ire^{Vj/Vt}(1+e^{Vk/Vt})$$

From Equation 4

$$k=\frac{I2}{Is}$$

$$=\frac{e^{Vj/Vt}}{e^{Vj/Vt}(1+e^{Vk/Vt})}$$

$$=\frac{1}{1+e^{Vk/Vt}}$$

which establishes Equation 5. It will be noted that the gain $k$ is independent of signal level and consequently there is no distortion. The foregoing calculations are only true provided I$s$ is generated from a high impedance source S.

It has been found experimentally that the circuit obeys this law very closely. The source of the control voltage V$k$ may be remote, so that the circuit forms a remote gain control. Either I1 or I2 may be regarded as the signal output and a load connected in series with the collector of either transistor Q1 or transistor Q2. Provided the load impedance is low compared with the output impedance of the transistors it will not affect the value of $k$.

Figure 3:
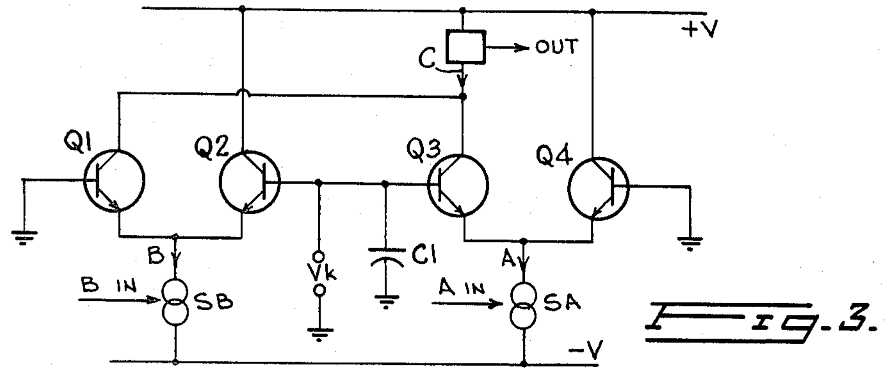
FIGURE 3 is a circuit of a first embodiment of the invention.

FIGURE 3 shows a circuit employing two pairs of parallel-connected grounded-base transistors Q1 to Q4, with the control voltage V$k$ applied to the bases of transistors Q2 and Q3. There are now two signal generators SA and SB representing conventional input circuits for signals A and B. The outputs of transistors Q1 and Q3 are added as an output current C. Assuming that both parts of the circuit respond in an identical fashion to the control voltage V$k$, the combined output current C is given by $$C=(1-k)A+kB \qquad (7)$$

This is the basic requirement for complementary mixing in a fader amplifier, since it satisfies Equations 1 and 2. It will be apparent that the other pair of collectors can generate the output current C and that the input signals A and B can be interchanged.

Figure 4:
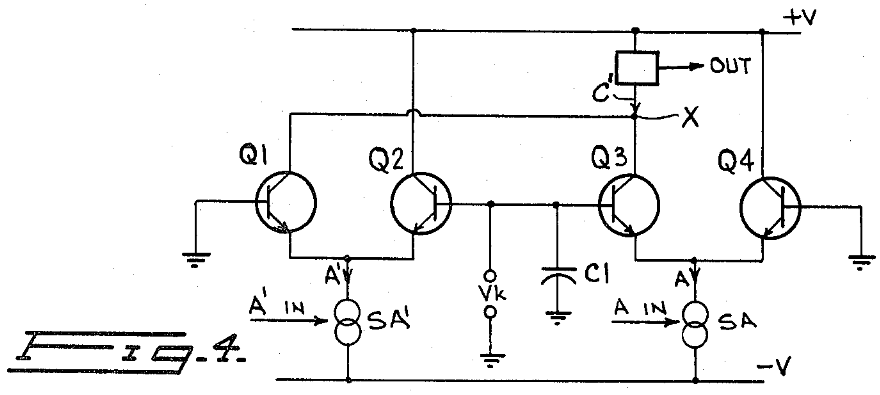
FIGURE 4 is a circuit of a second embodiment of the invention.

FIGURE 4 shows a circuit that is basically the same as that of FIGURE 3, except that instead of signal B there is inserted into the circuit of transistors Q1 and Q2 a current A' which is equal to the D.C. component of the input A. The output C' at node X now equals $(1-k)$A, with the important feature that there is no change in the D.C. component of the output C' for any alteration of the control voltage V$k$.

Take two circuits of FIGURE 4 and connect these in parallel across a direct voltage source. This will provide, in effect, a first circuit having two pairs of transistor and a second circuit having two further pairs of transistors. Impose a first signal A on a first pair of the first circuit and its complementary D.C. component A' on the second pair of the first circuit. Impose a second signal B on a first pair of the second circuit and its complementary D.C. component B' on the second pair of the second circuit. The input amplifiers for A and B are biased to have equal D.C. components, so that $A'=B'$. The collector current of one transistor of each of the four pairs is now brought to node X to derive an output which will be given by the equation $$C'=(1-k)A+k'B$$

where both $k$ and $k'$ can vary from zero to unity in accordance with bias voltages V$k$ and $Vk'$ which are applied respectively to one transistor of each pair of the first and second circuits as in FIGURE 4. Control voltages V$k$ and V$k'$ can be obtained from respective potentiometers each controlled by a fader arm of a conventional nature. It will then be arranged that, if the two fader arms are locked together, $k$ and $k'$ will vary from zero to unity together, thus providing a complementary mix. Spreading of the arms will provide a non-complementary mix.

Figure 5:
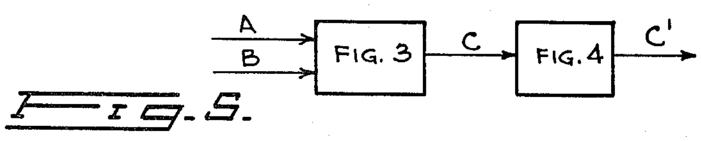
FIGURE 5 is a block diagram showing FIGURES 3 and 4 combined.

FIGURE 5 is a block diagram showing how the circuits of FIGURES 3 and 4 may be used as two successive stages of a combined circuit, the output C of the first stage forming the input (shown as the input A in FIGURE 4) of the second stage. If the gain factor $k$ in the second stage is written $m$, the final output is given by $$C'=m[(1-k)A+kB] \qquad (8)$$
$$=m[k(B-A)+A]$$

A fader amplifier with this output is the subject of Gordon B. Thompson's United States patent application Serial No. 339,217 filed concurrently herewith. It is thus apparent that the circuit of FIGURE 5 can be used in such a fader amplifier for television signals.

As has been already mentioned, a circuit of the present invention may be used as a television special effects amplifier. This will now be explained. Taking the circuit of FIGURE 3, suppose the control voltage V$k$, instead of being gradually varied by a fader control lever, is pulsed by the square wave shown in FIGURE 6, that is between two peak voltages V$pk$ and $-$V$pk$ for successive respective periods $t1$ and $t2$. These peak voltages will be chosen to be sufficiently great to shut off one or other signal completely. Thus to all intents and purposes $k=1$ for V$pk$ and $k=O$ for $-$V$pk$. The output C will alternate between A and B with no mixed output. Now, if V$k$ is switched at line rate, the effect will be video signal A on one side of the screen and video signal B on the other side of the screen. By increasing the length of $t1$ at the expense of $t2$, the effect is a horizontal wipe. If, instead, V$k$ is switched at frame rate, division of the composite video signal into upper and lower portions and a vertical wipe are achieved.

Figure 6:
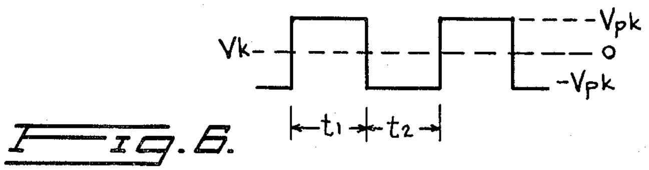
FIGURE 6 is a voltage waveform diagram.

The application of such a circuit with a pulsed control voltage to a time multiplexing system will be apparent. FIGURES 3 and 6 provide such a system for two sources. In a practical multiplexing communication system, more than two signals will normally require to be transmitted, and this can readily be achieved by taking a number of circuits like the circuit of FIGURE 1 and connecting such circuits in parallel across a common direct voltage source. The collector current of one transistor of each pair will be passed through a common load, similar to the arrangement of FIGURE 3. Thus one transistor of each pair will be switched on by a pulsed control voltage for the required interval.

We claim:

An amplifier comprising (a) first input means for a first input signal A and second input means for a second input signal B, (b) a first pair of parallel connected transistors of like polarity connected with their collector-emitter circuits in series with said first input means, (c) a second pair of parallel connected transistors of like polarity connected with their collector-emitter circuits in series with said second input means, (d) means connecting the bases of all said transistors to a reference voltage at least at signal frequencies, (e) means biasing said transistors to conducting condition including control means for varying the bias on a selected transistor of each pair, (f) and output means in series with said selected transistor of one pair and the other transistor of the other pair for generating an output signal $$C=(1-k)A+kB$$

where $k$ is a factor variable between zero and unity by said control means, (g) wherein said control means include means for repetitively pulsing the bias on said selected transistors to render the factor $k$ alternately substantially equal to zero and unity to repetitively switch said output C between signals A and B.

References Cited by the Examiner

UNITED STATES PATENTS

| | | | |
|---|---|---|---|
| 2,412,279 | 12/1946 | Miller | 330—130 X |
| 2,846,523 | 8/1958 | Leavitt et al. | 330—130 X |
| 3,155,963 | 11/1964 | Boensel. | |
| 3,195,067 | 7/1965 | Klein et al. | 330—126 |
| 3,210,683 | 10/1965 | Pay | 330—69 X |

OTHER REFERENCES

Army Technical Manual, TM 11–690, March 1959, pages 188–193, U.S. Government Printing Office.

ROY LAKE, *Primary Examiner.*

F. D. PARIS, N. KAUFMAN, *Assistant Examiners.*